United States Patent [19]
Puhl et al.

[11] Patent Number: 5,620,491
[45] Date of Patent: Apr. 15, 1997

[54] PROCESS AND APPARATUS FOR DECONTAMINATING GLASS CULLET

[75] Inventors: Michael W. Puhl; Luther H. Dore; Roger L. Erb, all of Marion, Ind.

[73] Assignee: Ball-Foster Glass Container Company, LLC, Muncie, Ind.

[21] Appl. No.: 400,749

[22] Filed: Mar. 8, 1995

[51] Int. Cl.⁶ .................................................. C03B 32/00
[52] U.S. Cl. .......................... 65/102; 65/127; 134/25.1; 134/29
[58] Field of Search ................. 65/65, 102, 120, 65/127, 272, 252; 134/25.1, 25.5, 26, 29

[56] References Cited

U.S. PATENT DOCUMENTS

| | | | |
|---|---|---|---|
| 708,840 | 9/1902 | Sörensen. | |
| 2,436,509 | 2/1948 | Faust | 23/143 |
| 2,891,881 | 6/1959 | Jaffe | 134/2 |
| 3,615,815 | 10/1971 | Wainer | 134/2 |
| 3,897,330 | 7/1975 | Rhys | 209/75 |
| 3,998,927 | 12/1976 | Hudson et al. | 423/119 |
| 4,119,760 | 10/1978 | Rinehart | 428/410 |
| 4,468,375 | 8/1984 | Misra | 423/122 |
| 4,762,638 | 8/1988 | Dollman et al. | 252/135 |
| 4,781,742 | 11/1988 | Hill et al. | 65/29 |
| 5,022,985 | 6/1991 | Nugent | 209/172.5 |
| 5,364,426 | 11/1994 | Richards | 65/474 |

*Primary Examiner*—Lyle A. Alexander
*Attorney, Agent, or Firm*—Wallenstein & Wagner, Ltd.

[57] ABSTRACT

The present invention relates to a process and apparatus for the processing contaminated glass cullet, or foreign cullet, into furnace-ready cullet. A furnace may also be used to melt the furnace-ready cullet into glass articles of manufacture. Foreign cullet is continuously fed into a tank containing a solution of sodium hydroxide. The sodium hydroxide reacts with metallic aluminum particles in the foreign cullet, dissolving small aluminum particles, and floating particulate contamination to the surface where it is skimmed and filtered. Crushed glass sufficiently free of metallic aluminum is removed from the tank by a drag chain running along the bottom of the tank producing a furnace-ready cullet. A crusher or pulverizer may be used prior to the treating tank, and a glass melting furnace and glass molding operation may be employed downstream from the treatment tank.

20 Claims, 1 Drawing Sheet

PROCESS AND APPARATUS FOR DECONTAMINATING GLASS CULLET

DESCRIPTION

1. Technical Field

The present invention generally relates to a process and apparatus for recycling waste glass.

2. Background of the Invention

Processes for manufacturing glass articles are well known in the art. A typical batch comprises a mixture of raw materials, such as sand, lime, soda ash and other conventional ingredients. The batch may also contain decontaminated glass cullet recycled from scrap or waste glass. The batch is mixed and transferred to a glass furnace where it is melted. Molten glass flows from the furnace to a molding process that forms glass articles of manufacture.

Glass cullet has been categorized into "In-house cullet" and "foreign cullet." In-house cullet, is derived from two sources: Defective glass articles, such as glass bottles, inspected after a glass molding process; and molten glass drawn from a glass melting process when bottles are not being manufactured. The defective bottles and the drawn glass may be crushed to form an In-house cullet.

In-house cullet is recycled directly into a batch of raw materials without being decontaminated. In general, the In-house cullet is free of aluminum and other contaminants because no labels, aluminum caps or safety rings had been attached prior to being crushed into cullet. The defective bottles do not include aluminum or other contaminants because the bottles are inspected and removed from the production line before any labels or caps are attached. Thus, In-house cullet generally does not need to be decontaminated before being added to a melt furnace. Such contamination-free cullet is also referred to as "furnace-ready cullet."

In contrast, foreign cullet, also referred to as recycled cullet, is generally not furnace-ready. Most foreign cullet cannot be added directly to a furnace because it contains metallic aluminum and other contaminants. One reason metallic aluminum is undesirable is because it causes defects in molded bottles.

Foreign cullet is primarily derived from discarded glass articles, such as beverage bottles. Labels, aluminum caps and aluminum safety rings may be attached to the glass bottles. The discarded bottles are crushed to form the foreign cullet which contains crushed glass, labels, aluminum caps and rings, and particulate aluminum. In the past, a significant amount of foreign cullet was not capable of being recycled into the melt furnace because the aluminum could not be removed economically. Hence, there has been a long-felt need to economically decontaminate foreign cullet so that more cullet could be recycled.

Recycling foreign glass cullet has several benefits and advantages. A portion of the raw materials are conserved by replacing it with foreign cullet. For example, recycled foreign cullet can make up a significant amount of a batch used to produce new glass articles. Raw material costs can be reduced where the foreign cullet is less expensive than the corresponding raw materials. Moreover, environmental pollution is reduced by recycling waste glass that would otherwise pollute the environment or occupy space in landfills. On the whole, recycling foreign cullet has significant financial as well as social benefits.

Current sources of waste glass could provide a continued supply of recyclable foreign glass cullet. Discarded glass articles, such as beverage bottles, provide an abundant source of waste glass. Foreign cullet generally contains crushed glass, fines, dust, aluminum, label fragments and other contaminants. The aluminum and other contaminants may be present in unacceptable and undesirable amounts. The term "fines" means small particles of glass less than about 1/16" or 12 mesh in size. Fines may comprise 5–15% by volume of the total foreign cullet. Glass fines less than about 200 mesh are defined as "dust."

Dust is undesirable because it accelerates the wear on refractory linings in the melting furnace. During melting, dust impinges the brick lining causing costly wear and erosion. Dust also escapes from the furnace into the exhaust stack increasing particulate emission. Such particulate emissions is undesirable because it pollutes the environment and increases the potential for non-compliance with air quality emission standards. Hence, there exists a long-felt need to reduce the concentration of dust in glass cullet.

In contrast, the presence of metallic aluminum in glass cullet is highly undesirable. The source of metallic aluminum is primarily closure devices, aluminized paper bottle labels, bottle caps, and tamper-evident aluminum bands left around the neck of a bottle when the aluminum cap is removed. In the furnace, aluminum reacts with silica ($SiO_2$) forming silicon metal (Si) and Aluminum Oxide ($Al_2O_3$). The silicon metal forms spheres that cause localized stress fractures and weaknesses in the surrounding glass. As a result, such imperfections increase the number and frequency of defective molded glass articles. An increased level of defects is undesirable because manufacturing costs increase correspondingly.

To remove metallic aluminum from the foreign cullet, attempts have been made to detect and reject with eddy current devices mechanically vacuum, and manually sort the glass cullet. However, prior attempts have failed to consistently produce furnace-ready cullet sufficiently free of contaminants so that it is useful in manufacturing glass articles. Hence, there exists a long-felt need to economically remove metallic aluminum from rejected foreign cullet.

The present invention fulfills the long-felt needs discussed above by providing a process and apparatus for economically decontaminating some foreign glass cullet. In the past, foreign cullet was not capable of being processed into glass articles because it was too contaminated. The present invention efficiently and effectively removes metallic aluminum and other contaminants from foreign cullet producing a furnace-ready cullet.

By recycling the furnace-ready cullet, the amount of discarded glass that is capable of being recycled is increased. Correspondingly, the amount of waste glass and dust that pollutes the environment or occupies landfills is decreased. Hence, the present invention helps save the environment by reducing the need for landfills and recycles waste glass which would otherwise be disposed of.

SUMMARY OF THE INVENTION

Figure 1:
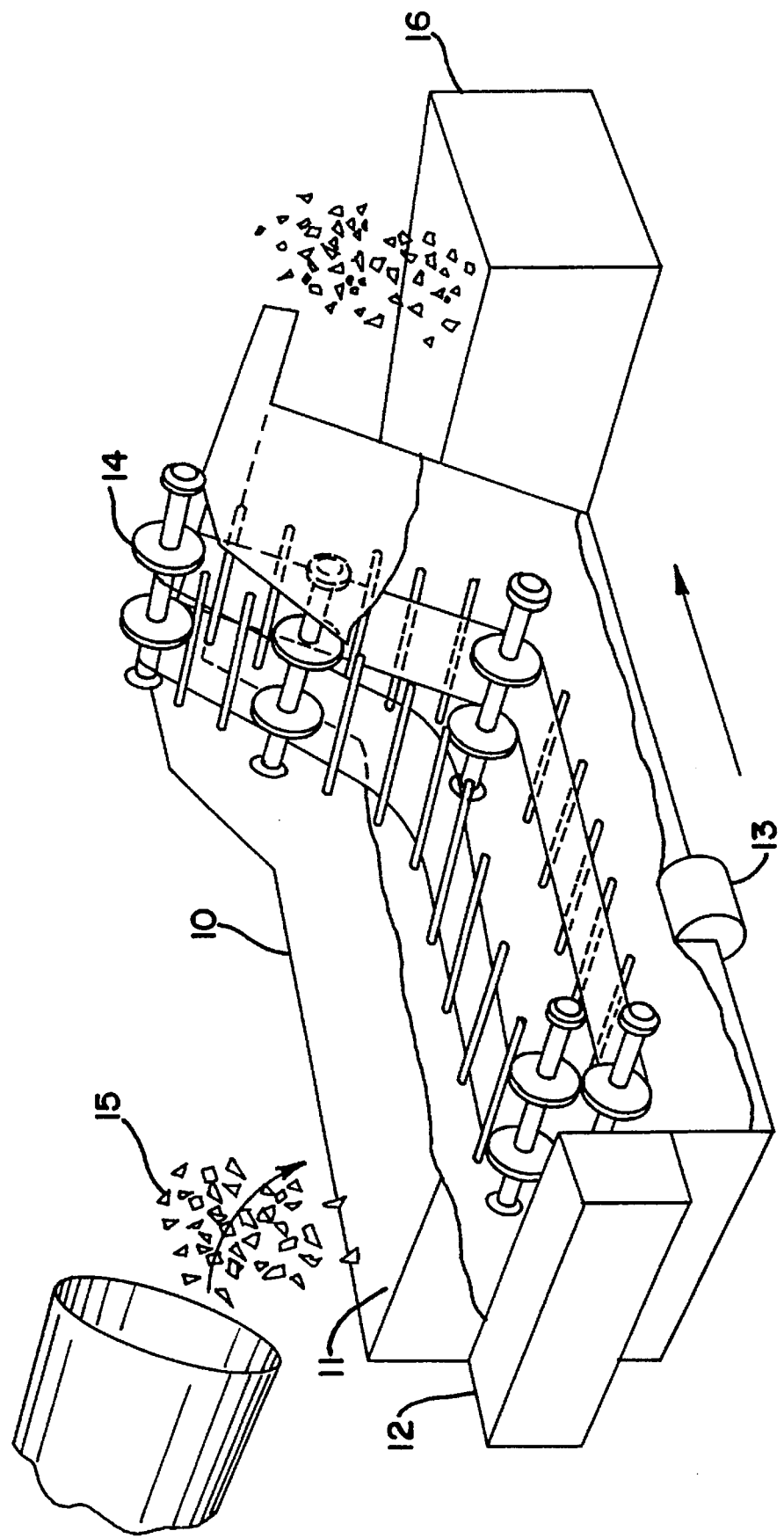
FIG. 1 shows the Cullet Decontamination Apparatus of the present invention.

One aspect of the invention is a process for decontaminating foreign glass cullet to produce a furnace-ready glass cullet. Foreign glass cullet is derived from a waste glass and contains crushed glass, metallic aluminum, fines, and dust in an amount in excess of that necessary to economically recycle the cullet through a glass making process. Foreign cullet may also contain other organic and inorganic contaminants in excessive amounts. Fines may comprise about 5–15% by volume of the total foreign cullet.

The process of the present invention includes three essential steps. Foreign cullet comprising crushed glass, fines, dust and metallic aluminum is provided. The metallic aluminum may be aluminumized paper bottle labels, bottle caps or tamper-evident bands. The term "crushed glass means" glass chunks greater than 1/16" or 12 mesh and less than 2 inches in size. Crushed glass is a desirable component of the foreign cullet. Preferably, the crushed glass includes glass chunks greater than 3/8 in size. The foreign cullet may be provided periodically, or, more preferably, continuously.

The foreign cullet is continuously treated with an effective concentration of a caustic solution producing a treated cullet which includes crushed glass, fines, an aluminate compound and non-reacted metallic aluminum. By "effective concentration" it is meant that the caustic compound reacts with the aluminum in the cullet producing enough hydrogen bubbles to float the aluminum and other contaminants to the surface. Preferably, the caustic solution is a solution of sodium hydroxide in a concentration of about 5–30% by weight of sodium hydroxide. Preferably, the concentration of the sodium hydroxide is 10–20%, and, more preferably, about 15% by weight sodium hydroxide. Potassium hydroxide may also be used.

The treated cullet is removed as a furnace-ready cullet comprising crushed glass and fines sufficiently free of metallic aluminum, dust and other contaminants. Substantially no fines are removed from the treated cullet. The phrase furnace-ready cullet comprising crushed glass and fines sufficiently free of metallic aluminum, dust and other contaminants means that the resultant cullet is capable of being recycled along with conventional raw materials to produce glass articles substantially free of stress fractures, weaknesses, blemishes and other imperfections. By substantially free it is meant that molded glass made from the cullet conforms to industry standards.

Treated cullet may be removed periodically, or, more preferably, in a continuous manner. The process may also include periodically or continuously regenerating the caustic solution with a solid caustic or a caustic solution. Preferably the process is continuously regenerated with a caustic solution of sodium hydroxide in a concentration of about 5–30% by weight sodium hydroxide.

The process may also include removing dust, metallic aluminum, or other contaminants from the foreign glass cullet while treating the foreign glass cullet. The contaminants may be periodically removed or, preferably, in a continuous manner. At least a portion of the dust, aluminum and other contaminants are removed by skimming such contaminants as it floats to the surface.

The process may also include processing the furnace-ready cullet into glass articles of manufacture. The furnace-ready cullet may be processed alone or in combination with conventional ingredients used to manufacture glass articles, such as sand, lime and soda ash. Such materials are melted in a glass furnace and molded into glass articles.

The process may further include steps prior to providing the foreign glass cullet. The process may include providing a starting glass comprising glass, metallic aluminum and other contaminants. The starting glass includes broken and unbroken discarded, or waste, glass articles. The process may also include crushing the starting glass producing a foreign cullet.

Optionally, contaminants may be removed from the foreign cullet, starting glass or both. The contaminants may be removed by manual sorting, screening, vacuuming, magnetic filtering, blowing with air jets, detecting and discharging non-ferous metals using an eddy current generating device, or combinations thereof.

Another aspect of the invention is an apparatus for decontaminating foreign glass cullet to produce furnace-ready glass cullet. The apparatus comprises three essential components. One component is a means for providing the foreign glass cullet which includes crushed glass, fines, dust and metallic aluminum. The foreign cullet may be provided periodically, or, preferably, in a continuous manner. The providing means may be a conveyor, a storage bin, manual handling or combinations thereof.

Another component of the apparatus is a means for continuously treating the foreign glass cullet with an effective concentration of a caustic solution, preferably a solution of sodium hydroxide. The concentration of the sodium hydroxide may be 5–30% by weight or, preferably, 10–20% by weight of sodium hydroxide. The treating means provides a treated cullet comprising crushed glass, fines, dust, an aluminate compound and non-reacted metallic aluminum. A tank containing the sodium hydroxide solution may be used to treat the foreign cullet.

Another component of the apparatus is a means for removing the treated cullet residing within the tank. The removing means produces a furnace-ready cullet including crushed glass and fines sufficiently free of metallic aluminum, dust and other contaminants. Substantially no fines are removed from the treated cullet. A drag chain conveyor may be used to remove the furnace-ready cullet from the tank. The furnace-ready cullet may be collected on a conveyor or in a storage bin or like container.

The apparatus may also include a tank skimmer for removing at least a portion of the dust, the metallic aluminum and other contaminants. The tank may further include a means for regenerating the caustic solution in the tank. The regenerating means may include adding sodium hydroxide in solid form or as a solution. The caustic may be added manually or by a metering pump.

The apparatus of the present invention may further include a furnace and a molding operation, or device, for processing the furnace-ready cullet into glass articles of manufacture. The furnace ready cullet may be processed in the furnace in combination with raw materials including sand, lime soda ash and other conventional ingredients.

Prior to the treating tank, the apparatus may also include a means for providing a starting glass. Preferably, the providing means is a collection bin, a conveyor or a combination thereof. The starting glass comprises broken and unbroken glass bottles, metallic aluminum and other contaminants.

In addition, prior to the starting glass providing means, the invention may further include a means for crushing the starting glass to produce a foreign glass cullet. The crushing means may be a crusher or pulverizer that crushes glass articles within a size distribution of from about 2 inches down to dust.

Optionally, the apparatus further includes a means for removing contaminants from the foreign glass cullet or the starting glass. The removing means may be placed such that contaminants are removed from the starting glass, the foreign cullet or a combination thereof. The crusher and the removing means may be the apparatus disclosed in U.S. Pat. No. 3,897,330 which is incorporated herein by reference.

The removing means may also include manual sorting, a screener, a vacuuming device, a ferrous magnetic filtering device, an air jet, an eddy current generating device capable of detecting and discharging non-ferrous metals or combinations thereof. One eddy current generating device is that disclosed in U.S. Pat. No. 4,781,742 which is also incorporated herein by reference.

Large pieces of aluminum, as well as other large pieces of waste or contaminants, may also be removed using a Tectron unit. A Tectron unit is known in the art for detecting non-ferrous metals, such as aluminum. The Tectron unit sets up eddy currents in the metal, setting off a discharge device.

DETAILED DESCRIPTION OF THE INVENTION

Foreign glass cullet 15 is not ready for melting and forming into glass articles because it contains an unacceptable level of contamination, particularly metallic aluminum. An undesirable amount of dust may be present in the foreign cullet. Foreign cullet 15 may also contain various other particles of organic and inorganic waste matter.

The present invention eliminates a sufficient amount of metallic aluminum as well as other contaminants from foreign cullet providing a furnace-ready cullet. The foreign cullet contains crushed glass, fines, dust, metallic aluminum and other contaminants. The crushed glass is the most desirable component of the foreign glass cullet. Crushed glass about 3/8" in size is preferred.

As shown in FIG. 1, the apparatus of the present invention comprises a tank 10 containing a solution of sodium hydroxide 11, a skimmer 12, a recycle pump 13 and a drag chain conveyor 14. Other removing means include a screw device or other means known in the art. Other treatment methods may also be utilized, such as counter-current flow of cullet and sodium hydroxide streams.

Contaminated, foreign cullet 15 is added to and circulated within the tank 10 containing the sodium hydroxide solution 11. The tank 10 is sized to ensure a residence time sufficient to float or dissolve a sufficient amount of the metallic aluminum. Preferably, the residence time is 1–30 minutes.

It is important to remove a sufficient amount of the aluminum because the aluminum reacts in the furnace causing undesirable results. While the glass melts in the furnace, a portion of the aluminum (Al) reduces the silicon dioxide, or silica ($SiO_2$), to form silicon metal (Si) and aluminum oxide, or alumina ($Al_2O_3$). The silicon metal is undesirable because it causes problems in the molding process.

The silicon metal forms metal spheres, or "silicon stones" having high surface tensions. The metal spheres also have a different coefficient of thermal expansion than the glass which imparts a tensile stress at the interface of the silicon sphere and the surrounding glass. The tensile stresses fracture and crack the glass around the stone which become apparent in molded bottles.

In addition, small stress fractures caused by the silicon stones may weaken the glass container. During normal usage of the glass container, weaknesses may worsen resulting in fractures. Additional stresses from external impacts or internal pressures also cause fractures. Thus, aluminum must be economically removed from the foreign cullet.

As the sodium hydroxide solution 11 treats the foreign cullet, a portion of the aluminum reacts with the sodium hydroxide. Smaller pieces of aluminum are dissolved. During the reaction, hydrogen gas bubbles are generated and form on larger pieces of aluminum. These bubbles float a portion of the larger aluminum pieces to the surface of the caustic solution. A portion of the other contaminants, such dust and paper labels, also float to the surface. The floating materials are skimmed off the surface of the solution 11 and filtered through the skimming tank 12 having a screen disposed therein.

Material on the bottom of the tank may include reaction products, inert organics, inert inorganics, fines, dust, and aluminum chunks. Small amounts of the sodium hydroxide solution, reaction products, such as $NaAlO_2$, and contaminants may be removed from the tank along with the cullet. These materials in small concentrations are not problematic in the furnace and molded operations.

The aluminum contaminants react with the sodium hydroxide solution 11 producing hydrogen gas ($H_2$) and sodium aluminate ($NaAlO_2$). Non-reacted aluminum may also be present, while the sodium aluminate remains in solution. Hydrogen bubbles form on the undissolved aluminum possibly floating it to the surface. The floating aluminum is skimmed off and filtered through the skimming tank 12. The liquid filtrate from the skimming tank is recirculated back into the tank 10.

The drag chain conveyor 14 moves the crushed glass through the tank 10 and agitates the contents of the tank 10. If floated to the surface, some particles are trapped and filtered in the skimmer 12. The filtrate is recycled back into the tank 10 by a metering pump 13. The crushed glass is collected in a collection bin 16. The contents of the collection bin 16 may be transferred to a conventional glass furnace for melting and forming into various glass articles.

Optionally, the concentration of the caustic solution is maintained at a predetermined level by a regenerating means. One such regenerating means is a "Caustic Monitoring and Control System" manufactured by Barry Wehmiller, Inc., 8020 Forsyth Boulevard, St. Louis, Miss. 63105, as disclosed in a document entitled "Caustic Monitoring and Control System Manual", dated Nov. 9, 1993, at pages 1–33 which is incorporated herein by reference. Another regenerating means may include sensors sold by Rosemount Analytical, Inc., 2400 Barranca Parkway, Irvine, Calif. 92714, as shown in the document entitled "Models 222, 225, 226 and 228 Toroidal Conductivity Sensors", I71-200 Series, July 1992, at pages 1–8. This system also includes a microprocessor also sold by Rosemount Analytical as disclosed in the document entitled "Model 1054A Percent Concentration Microprocessor Analyzer," I71-1054A %, October 1992, at pages 1–4.

A sufficient amount of the undissolved metallic aluminum will float to the surface of the caustic solution 11. Other contaminants or waste, such as paper fibers, rubber particles, and the like, may also float to the surface of the solution to be trapped in the skimmer 12.

Hydrogen bubbles adhered to the aluminized paper labels facilitate flotation. The hydrogen bubbles formed at the reaction sites on the metallic aluminum metal buoy the aluminum to the surface of the solution. Excessive agitation, however, may cause the bubbles to dislodge and sink the aluminum. However, the aluminum can be re-surfaced by the hydrogen bubbles.

It is to be understood that the present disclosure is to be considered as an exemplification of the principles of the invention. It is not intended to limit the broad aspects of the invention to the illustrated embodiment.

It is understood that the invention may be embodied in other specific forms by one of ordinary skill in the art without departing from its spirit or central characteristics. The examples and embodiments are to be considered as illustrative and not restrictive. The invention is not intended to be limited to the details of the listed embodiments. Rather, the invention is defined by the claims interpreted broadly.

WORKING EXAMPLES

Tests involving microscopic analysis and chemical and physical analysis were conducted on commercial glass cullet samples. The purpose was to determine the composition and makeup of the samples in order to develop sampling and analytical techniques for practical identification and control of the foreign cullet supply. Another purpose was to observe the reaction of contaminated cullet samples when immersed in sodium hydroxide solution.

The samples comprised crushed cullet with the largest dimension of the particles being about ⅛ of an inch. The crushed cullet was examined under the microscope at 10–70X and was observed as glass fragments of about 0.01 millimeters (mm) to about 3.0 millimeters (mm) in size.

About 2–3 grams (gms) of each sample of the crushed cullet was placed in a standard Petri dish. Various concentrations of sodium hydroxide solution, from 10–20% by weight sodium hydroxide solution, were added to the crushed cullet samples in each Petri dish, and each sample reaction was viewed under a microscope. All of the cullet samples revealed the presence of small aluminum fragments, and the cloudy supernatant liquid showed evidence of varying amounts of fiber and organic material. The cloudy mixture was decanted, or drawn off, and the cullet was washed with water several times. Magnetic material in the form of powder or flakes was always present in each sample. The magnetic material could be dissolved with hot dilute hydrochloric acid (HCl).

A single Loss on Ignition test was conducted. Loss on Ignition is a standard analytical procedure whereby a sample is heated to red hot in a crucible for a period of time. Any volatile or combustible components are thereby removed. The sample is weighed before and after the ignition, and the loss in weight is reported as a percent. In the tests conducted with the present invention, the ignition loss materials were primarily plastics and paper. The percent Loss on Ignition varied over a wide range depending on the particular sample. It is difficult to burn out organic materials from cullet that softens at 1300° F. The Loss on Ignition test resulted in a 0.4% Loss on Ignition. However, all of the material would be expected to burn off during the melting operation in the glass furnace.

Examination of thirteen (13) cullet samples revealed the following common characteristics:

1. Addition of NaOH solution revealed the presence of aluminum or aluminum foil fragments. The addition of NaOH released hydrogen caused the larger aluminum particles to float.
2. Little or no dirt was observed in the samples. The main contaminants observed were organic materials, such as paper fibers and fiber-board.
3. The powder fines were glass fragments of 0.1–0.01 millimeters (mm) in size. A microscopic analysis gave a reasonably accurate value for color composition of fine glass particles.
4. Black and red magnetic particles in the form of iron oxide scale and whiskers were observed in most samples.
5. Other black particles observed included black rubber, ink, and glass which was either from tank bottom minings during rebuilds or the mold dope-coated conglomerates found around Individual Section (IS) glassmaking machines.
6. Some stone pebbles were observed and one sample showed white ceramic.

The observations from the tests conducted on the glass cullet samples suggest that most of the contaminants of glass cullet pose no problems in the glassmaking process. Iron oxides were always present but could be easily dissolved by molten glass. The tiny pebbles observed could also be dissolved by molten glass, and the organic materials generally could be burned in the furnace.

The following examples illustrate the results of microscopic analysis and chemical and physical testing of the 13 samples of commercial cullet, under the conditions discussed above:

EXAMPLE I

The cullet sample initially appeared grey in color due to the presence of organic material. When 15% by weight NaOH solution was added to the grey cullet, small fragments of aluminum and aluminum label reacted with the NaOH releasing hydrogen. Aluminum particles floated to the surface of the solution. Floating pieces of glass were also observed, but when a wetting agent, such as dishwashing detergent was added, the glass particles sank to the bottom of the solution. The reaction took several minutes to develop and was not clearly visible to the naked eye but was clearly visible under the microscope. The particles were observed to be predominantly amber glass, with about 1% of the particles being flint and green. Below a certain size, all of the glass particles appeared similar to flint.

EXAMPLE II

The cullet sample initially appeared grey in color and dirty and contained aluminum caps and a baby food jar lid. The addition of NaOH solution to the sample and a water wash of the sample showed large amounts of organic matter, including wood fibers, paper, and fiberboard. The NaOH solution produced numerous bubbly and shiny aluminum reaction sites on the surface of the aluminum pieces. The glass cullet sample comprised about 50% amber and 50% flint. Few pebbles were observed. How ever, soft, black, coal-like particles, probably rubber, were observed.

EXAMPLE III

The cullet sample initially appeared grey in color and comprised 1%–2% amber and the remainder of the sample comprised flint. The added NaOH solution produced bubbling, but the NaOH solution appeared cleaner than previous sample reactions. Other particles observed included some dark specks, a pebble, a piece of wood, and magnetic material.

EXAMPLE IV

The cullet sample comprised 30% amber and 70% green. The addition of NaOH solution produced bubbling. Not much organic material was observed, but some black material, either rubber or paint, was observed. Magnetic separation produced the red $Fe_2O_3$ and black $Fe_3O_4$ scale pieces and whiskers from attrition.

EXAMPLE V

The cullet sample comprised 99% amber. Adding NaOH solution produced less vigorous bubbling than previously. Magnetic material was removed dry or from the water/cullet mixture.

EXAMPLE VI

The cullet sample comprised 100% amber. The addition of NaOH solution produced small reactive aluminum sites and a cloudy dispersion. Other materials observed included black rubbery material, paint, and a few pebbles.

EXAMPLE VII

The cullet sample comprised 99% amber and 1% green. The addition of NaOH solution produced less bubbling than usual. After a water wash of the sample, examination of the sample showed label and paint fragments, two pebbles, black magnetic particles, and one black piece of glass.

EXAMPLE VIII

The cullet sample initially appeared grey in color due to the high content of fibers and organic materials. After the addition of NaOH solution and a water wash showed the cullet sample to be comprised of 95% amber, some flint and green, a few pieces of white ceramic, and some dark particles. The dark particles appeared to be magnetic particles, black stones, dark rubbery fragments, or black glass. The black glass particles were observed served in several other cullet samples, and upon closer examination at a higher magnification, the dark particles appeared to be glassy conglomerates with black dope, commonly seen around the floor of an IS machine. Another form of black glass was also observed to be black amber from tank bottom minings at rebuilds.

EXAMPLE IX

The cullet sample comprised 99% amber. The addition of NaOH solution produced a clearer, cleaner solution than previous samples. Materials observed in the sample included aluminum, magnetic material, black particles, and particles from tank bottom rebuilds.

EXAMPLE X

The cullet sample comprised 98% amber. The addition of NaOH solution produced a brown cloudy liquid. A black particle about 0.5 millimeters (mm) in size was observed. Upon examination of the black particle at a higher magnification, the black particle was found to be glass covered with black grease or mold dope.

EXAMPLE XI

The cullet sample comprised 99% amber. The addition of NaOH solution produced a very clean supernatant solution. Only a few black particles were observed.

EXAMPLE XII

The cullet sample comprised 99% amber. A concentration of 20% by weight NaOH solution was added to the cullet sample. No quantitative difference in reaction was evidenced between use of the 20% by weight NaOH solution or use of the 10% or 15% by weight NaOH solutions. Two pebbles were observed, and the presence of other contaminants was low.

EXAMPLE XIII

The cullet sample comprised primarily amber. The addition of 20% NaOH produced numerous floaters and much bubbling from aluminum slivers and fragments. The reaction of the NaOH solution and aluminum was still evidenced after 12 minutes. Other materials observed in the sample included two black rubber particles, and two glass particles covered with black residue and which were not soluble in trichloroethane.

Additional experimental tests, separate and distinct from the tests conducted above, were performed. These tests involved the effect of various concentrations of sodium hydroxide solution on aluminum.

The first set of experiments on aluminum used a 10% NaOH solution:

A 10 millimeter (mm) thick aluminum cap was introduced into a 10% sodium hydroxide (NaOH) solution. The aluminum dissolved in approximately 100 minutes or at the rate of approximately 1 millimeter of aluminum per 10 minutes in solution.

A ½ inch square piece of aluminum foil 3 millimeters (mm) thick and plastic coated on one side was introduced into a 10% NaOH solution. The aluminum dissolved in approximately 30 minutes or at the rate of approximately 1 millimeter of aluminum per 10 minutes in solution.

A ½ inch square piece of household aluminum foil 1 millimeter (mm) thick was introduced into a 10% NaOH solution. The aluminum dissolved in approximately 10 minutes or at the rate of approximately 1 millimeter per 10 minutes in solution.

A paper label containing aluminum was introduced into a 10% NaOH solution. The paper quickly separated and floated to the surface of the solution. The aluminum dissolved in approximately 10 minutes.

In the above tests, hydrogen bubbles formed at the reaction sites on the aluminum metal, thus buoying the aluminum to the surface of the solution. If the bubbles became dislodged by agitation, the aluminum metal sank in solution. However, the reaction between the aluminum and the sodium hydroxide quickly generated additional hydrogen gas and caused the aluminum metal to resurface and float.

The second set of experiments on aluminum included the following:

Eight fragments cut from a bottle cap were introduced into a 5% NaOH solution. Seven of the fragments floated to the surface in two (2) minutes. The eighth fragment floated to the surface in four (4) minutes. A complete cap floated in four (4) minutes.

One aluminum cap and two crushed caps were introduced into a 10% NaOH solution. One of the crushed caps floated within approximately 1½ minutes. The other crushed cap floated within 3½ minutes. The uncrushed cap floated in approximately 6 minutes.

The thread portion of the caps dissolved, but the three (3) cap tops remained in tact, protected by the enamel on the outside and the heavy sealing liner on the inside.

We claim:

1. A process of decontaminating foreign glass cullet to produce furnace-ready glass cullet comprising the steps of:

providing a foreign glass cullet comprising crushed glass, and metallic aluminum;

providing a bath of a caustic solution, the bath having a bottom surface and a top surface;

treating the foreign glass cullet with the bath of caustic solution to form a treated cullet comprising crushed glass, hydrogen gas, an aluminate compound in solution, and non-reacted metallic aluminum, wherein the hydrogen gas forms on the non-reacted metallic aluminum to float the aluminum to the surface of the bath while the crushed glass remains on the bottom of the bath;

removing the floating metallic aluminum from the surface of the bath; and, removing the treated cullet from the bottom of the bath to produce a furnace-ready cullet including crushed glass that is sufficiently free of metallic aluminum.

2. The process of claim 1 wherein the foreign glass cullet further comprises other organic and inorganic contaminants and the caustic solution is a solution containing 10–20% sodium hydroxide by weight.

3. The process of claim 1 wherein the fines comprise about 5–15% by volume of the foreign glass cullet.

4. The process of claim 1 wherein the metallic aluminum includes aluminumized paper labels, bottle caps or tamper-evident aluminum bands.

5. The process of claim 1 further including the step of removing dust and other contaminants from the foreign glass cullet.

6. The process of claim 1 wherein the step of removing contaminants from the foreign glass cullet and the starting glass further includes by manual sorting, screening, vacuuming, magnetic filtering, blowing with air jets, detecting and discharging non-ferrous metals with an eddy current generating device or combinations thereof.

7. The process of claim 1 wherein the caustic solution is sodium hydroxide;

the foreign glass cullet is provided continuously;

the glass cullet is treated continuously; and, the treated cullet is removed continuously.

8. The process of claim 7 wherein the concentration of the sodium hydroxide solution is from about 5% to about 30% by weight sodium hydroxide.

9. The process of claim 1 further including the step:

removing dust, metallic aluminum, and other contaminants while treating the foreign glass cullet.

10. The process of claim 9 further including the step:

processing the furnace-ready cullet in combination with raw materials including sand, lime and soda ash, into glass articles of manufacture.

11. The process of claim 1 further including the step of: regenerating the caustic solution with a solid caustic.

12. The process of claim 11 further including the step of regenerating the caustic solution with a second caustic solution.

13. An apparatus for decontaminating foreign glass cullet to produce furnace-ready glass cullet comprising:

a crusher for crushing a starting glass into a foreign glass cullet comprising crushed glass and metallic aluminum;

a bath of a caustic solution having a top surface and a bottom surface for treating the foreign glass cullet to form a glass cullet comprising crushed glass, hydrogen gas, an aluminate compound in solution, and non-reacted metallic aluminum, wherein the hydrogen gas forms on the non-reacted metallic aluminum to float the aluminum to the surface of the bath while the crushed glass remains on the bottom of the bath;

a skimmer for removing floating metallic aluminum from the surface of the bath; and, a means for removing the treated, furnace-ready cullet comprising crushed glass that is sufficiently free of metallic aluminum.

14. The process of claim 13 further including the step of removing dust and other contaminants from the foreign glass cullet.

15. The apparatus of claim 13 further including a furnace and a molding operation for processing the furnace-ready cullet in combination with raw materials including sand, lime, and soda ash into glass articles of manufacture.

16. The apparatus of claim 13 further including:

a means for regenerating the sodium hydroxide solution in the bath including adding a solid sodium hydroxide to the bath manually.

17. The apparatus of claim 16 wherein the means for regenerating the sodium hydroxide solution in the bath includes adding a second solution of sodium hydroxide using a metering pump.

18. The apparatus of claim 13 wherein the caustic solution contained within the bath is a solution of sodium hydroxide;

the means for removing treated cullet includes a drag chain conveyor, and wherein the metallic aluminum includes aluminized paper bottle labels, bottle caps or temper-evident aluminum bands.

19. The apparatus of claim 18 wherein the concentration of the sodium hydroxide solution within the bath is from about 5% to about 30% by weight sodium hydroxide.

20. The apparatus of claim 19 wherein the concentration of the sodium hydroxide solution within the bath is from 10–20% by weight sodium hydroxide.

* * * * *